April 28, 1964     C. R. JOHNSTON     3,130,690
FREIGHT LOADING APPARATUS
Filed Dec. 1, 1960
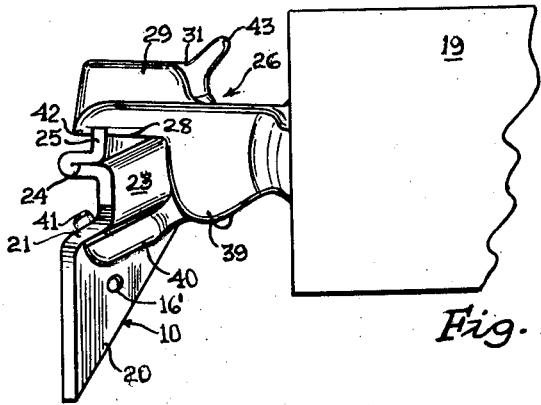
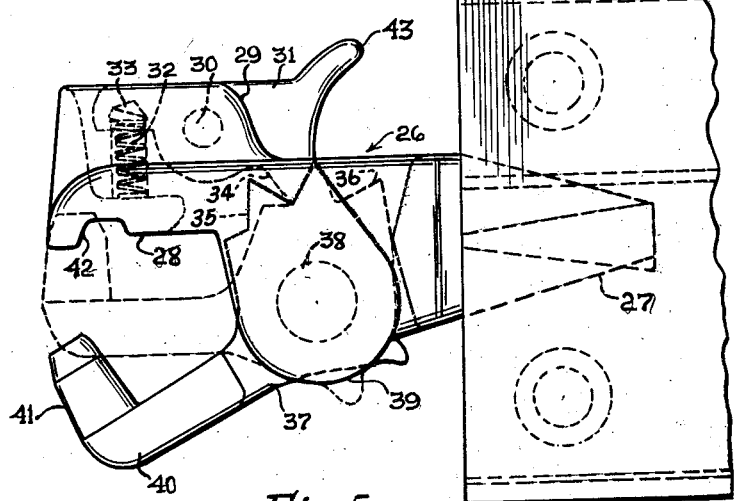
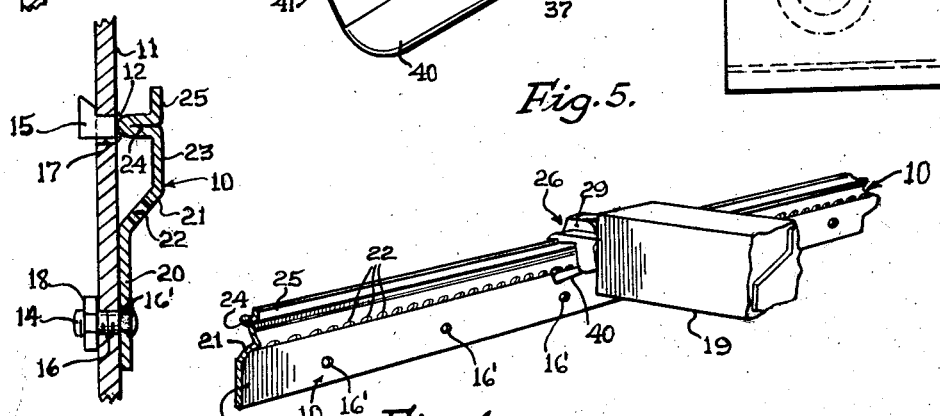
INVENTOR.
CHARLES RICHARD JOHNSTON
BY Threedy & Threedy
HIS ATTORNEYS.

United States Patent Office 3,130,690
Patented Apr. 28, 1964

3,130,690
FREIGHT LOADING APPARATUS
Charles Richard Johnston, 80 E. Jackson, Chicago, Ill.
Filed Dec. 1, 1960, Ser. No. 72,957
1 Claim. (Cl. 105—369)

This invention relates to new and useful improvements in a freight loading apparatus and more particularly to an arrangement of parts whereby a standard freight hauling vehicle may be readily and economically converted into a vehicle which may accommodate freight of assorted shapes and sizes.

The primary object of my invention is the provision in an apparatus of this character of a means for equipping the interior of a freight hauling vehicle with a removable freight positioning and retaining member.

Another object of my invention is the provision in an apparatus of this character of an arrangement of parts providing improved adjustable and removable crossbars extending between improved space-saving wall connectors.

A further object of my invention is to provide freight retaining bars which are equipped with a self-locking head.

A still further object of my invention is to provide in an apparatus of this character a wall-supported connector means for freight retaining bars, which means comprises belt-like members providing guiding and retaining surfaces and a latch receiving portion which occupies the least amount of interior space of the freight hauling vehicle.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a fragmentary perspective view of my improved freight loading apparatus;

FIG. 2 is a fragmentary side sectional view of the belt-like wall-supported connectors;

FIG. 3 is a fragmentary side sectional view showing a modified form of the belt-like connectors;

FIG. 4 is a fragmentary perspective view of the belt-like connectors and crossbar; and FIG. 5 is a fragmentary side elevational view of the connecting head of the crossbar showing parts thereof in operative position.

The hauling of freight of assorted shapes, sizes and weight has established the need for a shipper to simply and conveniently convert the interior of a standard freight hauling vehicle into a specialized design which will accommodate the various load capacities of assorted freight to be shipped, without materially reducing the interior size and capacity of the vehicle.

Referring to FIG. 1, I show a fragmentary perspective view of my invention which comprises a horizontally extending crossbar supporting member 10. This supporting member 10 is adapted to be mounted to any suitable structural member 11 (fragmentarily shown in FIGS. 2 and 3) of the interior side walls of a freight hauling vehicle.

These supporting members 10 are vertically spaced throughout the height of the vehicle and extend longitudinally with respect thereto. The supporting members 10 are adapted to be either fixedly connected to the structural members 11 of the vehicle such as by spot welding or the like as shown in FIG. 2 at 12 and 13, or they may be adjustably connected to the structural members 11. If the supporting members 10 are to be adjustably and removably connected to the side walls of the vehicle, they are provided with a locking pin 14 and a hook element 15 as seen in FIG. 3.

The locking pin 14 as well as the hook 15 are adapted to be removably inserted into suitable apertures 16 and 17 formed in the structural members 11 of the vehicle. The hook element 15 is first inserted into the aperture 17 so as to position the supporting member 10 in such manner that the locking pin 14 can be inserted through the apertures 16 and 16' in the member 11 and 10, respectively and be removably secured by means of the nut 18 threaded thereon.

The configuration of the supporting member 10 is such that there is presented a depending leg 20 which is adapted to lie in facial abutment with the structural member 11. A lateral diagonally disposed portion 21 extends longitudinally and transversely with respect to the length of the supporting member 10 as seen in FIGS. 1 to 4, and is provided with a plurality of horizontally aligned apertures 22. This diagonally disposed portion 21 terminates into a vertically extending section 23 adapted to lie in spaced parallel relation with respect to the side walls of the vehicle. This vertically extending portion 23 is bent at one end to provide a shelf-like element 24 which is of a length equal to the distance between the vertical section 23 and the structural element 11 as is established by the diagonally extending portion 21. This shelf-like element 24 is of a double thickness by reason of its being bent back upon itself as seen in FIGS. 2 and 3.

Extending vertically from the shelf-like element 24 in spaced parallel relation to the structural member 11 is a retaining lip 25.

As seen in FIGS. 1, 4 and 5, there is fragmentarily shown a freight retaining bar 19. This bar 19 may be of the construction shown and described in my Patents 2,806,436 and 2,896,554 and, as such, may be provided at either end with an attaching unit. This attaching unit comprises a forged head 26. This head 26 provides an insert tail 27 having separate diagonally extending legs for fixedly attaching the head 26 to the end of the bar 19.

The construction of the head 26 is substantially similar to that shown and described in my aforementioned patents and therefore I shall but describe the essential elements of its construction, noting particularly the major differences. The forged head 26 provides a lateral flat bearing surface 28 extending substantially transversely and longitudinally of the bar 19. On the upper face of the surface 28 are a pair of spaced apart ears 29. Journalled between the ears 29 on a shaft 30 is a pivotal latch member 31. Positioned between the ears 29 and carried by the upper side of the flat surface 28 is a spring 32 which contacts a forward portion of the latch 31 in a recess 33 formed therein so as to normally urge the latch 31 in a clockwise direction about its shaft 30 (FIG. 5). The latch 31 is provided with a suitable finger 43 extending rearwardly from between the ears 29.

The latch 31 is provided with a depending catch 34 which is adapted to engage in either of the notched-out portions 35 and 36 formed in a movable jaw-like element 37. The jaw-like element 37 is journalled on a shaft 38 which extends between two circular bosses 39. The jaw-like element 37 provides a lip member 40 which carries a laterally extending pin-like element 41.

The flat surface 28 is provided with a groove 42 which extends transversely to the longitudinal length of the bar.

In the application of my invention, the operator will grasp the finger 43 of the latch 31 and cause the same to pivot in an anticlockwise direction about the shaft 30 as seen in FIG. 5, against the action of the spring 32. This will cause the catch 34 to be disengaged from either of the notched-out portions 35 and 36 of the jaw-like element 37. The jaw-like element 37 will then be moved by gravity into an open position. The head 26 will be placed on the supporting member 10 in such manner that the lip 25 thereof will engage the groove 42 formed in the flat bearing surface 28 of the head 26. In such position the crossbar 19 may be readily moved longitudinally of the supporting member 10. When the crossbar 19 is in its desired position, the operator will pivot the jaw-like element 37 in a clockwise direction about its shaft 38, as seen in FIG. 5, until the pin 41 becomes inserted in any selected aperture 22 formed in the diagonal portion 21 of the supporting member 10, as shown in FIGS. 1 and 4.

The catch 34 of the latch 31 will by reason of the spring 32 engage the notched-out portion 35 of the jaw-like element 37 and latch the same in its locked position. When the jaw-like element 37 is in the unlatched position, it may be readily releasably secured therein by engagement of the catch 34 in the other notched out portion 36.

The groove 42 cooperating with the lip 25 will prevent the bar 19 from being disengaged from the supporting member 10 by reason of any lateral movement of the bar 19 with respect to the side walls of the vehicle. The groove 42 and lip 25 will cooperate with the jaw-like element 37 and the pin 41 as it engages in an aperture 22, to prevent vertical displacement of the bar 19 with respect to the supporting member 10.

By reason of the diagonal portion 21 of the supporting member 10, a minimum amount of interior space of the vehicle is utilized to achieve the positioning and locking of the freight bar 19 with respect to the side walls thereof. The horizontal and vertical stresses placed upon the head 26 are distributed onto the parts thereof that are specifically formed to resist the same. By this construction, the groove 42 and lip 25 are so designed and arranged that they will absorb the horizontal load placed upon the head 26 while the entire jaw-like element 37 as it engages the diagonal portion 21 will cooperate with the groove 42 and lip 25 to resist any vertical load placed upon the head 26. Neither the lip 25 nor the pins 41 are singly exposed to any stress placed upon the bar 19.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In a freight car having a freight-loading system including a freight-loading bar adapted to extend between the side walls of the car and transversely with respect to the longitudinal length thereof, (a) belt-like supporting rails carried by the side walls of the car in vertical spaced relation, (b) each of said supporting rails formed to provide a depending leg disposed in attached facial abutment with respect to the inner surface of the side walls of the car, (c) said leg terminating along one edge into an angular portion extending diagonally upwardly from the side walls of the car, (d) said angular portion having formed therein a plurality of horizontally aligned apertures, said angular portion terminating in a vertically disposed free upper edge portion in inwardly spaced relation to said side wall, means rigidly securing said free upper edge portion to said side wall, (e) connector means on opposite ends of said bar and having slidable contact with said free upper edge portion of said supporting rails whereby said bar may be freely positioned longitudinally of said car, (f) a jaw-like element pivotally carried by said connector means and having a latched and unlatched position, (g) a perpendicularly extending projection carried adjacent one end of said element for insertion into selected apertures in said angular portion of said supporting rails when said one end of said element is in facial abutment with said angular portion of said rails and said connector means is in slidable contact with said free upper edge portion of said rails, said perpendicularly extending projection cooperating with said connector means when said element is in its latched position and in facial abutment with said angular portion of said rails to prevent vertical, horizontal, and transverse displacement of said bar relative to said supporting rails, (h) a latch member carried by said connector means for releasably latching said jaw-like element in its latched position, (i) means provided by the other end of said jaw-like element, when said element is in facial abutment with said angular portion of said rails and angularly disposed with respect to said connector means, for engaging said latch member for preventing pivotal movement of said element and said perpendicularly extending projection carried thereby out of latching position with respect to said supporting rails, (j) interengaging means on said other end of said jaw-like element and said latch member for readily releasably securing said jaw-like member in said unlatched position.

References Cited in the file of this patent

UNITED STATES PATENTS

| | | |
|---|---|---|
| 2,576,425 | Thearle | Nov. 27, 1951 |
| 2,659,319 | Herman | Nov. 17, 1953 |
| 2,769,404 | Dietrichson | Nov. 6, 1956 |
| 2,808,788 | Stough | Oct. 8, 1957 |
| 2,857,856 | Cronin | Oct. 28, 1958 |
| 2,896,554 | Johnston | July 28, 1959 |
| 3,071,086 | Dunlap | Jan. 1, 1963 |